United States Patent [19]
Liberty

[11] Patent Number: 5,881,191
[45] Date of Patent: Mar. 9, 1999

[54] OPTICAL FIBER ADAPTER MOUNTING SYSTEM

[75] Inventor: Jonathan Liberty, Toronto, Canada

[73] Assignee: JDS Fitel Inc., Ontario, Canada

[21] Appl. No.: 943,119

[22] Filed: Oct. 3, 1997

[51] Int. Cl.$^6$ ..................................................... G02B 6/38
[52] U.S. Cl. ................................ 385/58; 385/53; 385/56; 385/76; 385/134
[58] Field of Search ................................. 385/55, 56, 58, 385/53, 70, 134, 135, 136, 139, 76

[56] References Cited

U.S. PATENT DOCUMENTS

| | | | |
|---|---|---|---|
| 4,749,251 | 6/1988 | Moulin | 385/78 |
| 5,274,729 | 12/1993 | King | 385/134 |
| 5,317,663 | 5/1994 | Beard et al. | 385/70 |
| 5,363,467 | 11/1994 | Keith | 385/135 |
| 5,600,746 | 2/1997 | Amett | 385/53 |
| 5,603,631 | 2/1997 | Kawahara et al. | 385/58 |
| 5,717,801 | 2/1998 | Smiley | 385/60 |

Primary Examiner—Hemang Sanghavi
Attorney, Agent, or Firm—Neil Teitelbaum & Associates

[57] ABSTRACT

A device for releasably mounting an adapter designed for coupling two fiberoptic connectors, e.g. SC connectors, has a body with a cavity sized to match the outside profile of the adapter when inserted in said cavity for a securely captive position. The adapter has two outside spring clips. The cavity has a bottom wall, two side walls, an upper wall and two détentes disposed to engage the spring clips when the adapter is fully inserted into the cavity. A leaf spring is disposed at the bottom of the cavity and is adapted to bias the adapter towards the upper wall of the cavity whereby the spring clips engage the détentes. The bottom wall and the spring are designed to form an enlargement of the cavity in the front part thereof when the spring is depressed, the enlargement enabling a manual tilting of the adapter causing a disengagement of the clips with the détentes whereby the adapter can be removed. The simple design of the mounting device permits a quick mounting of the adapter and its removal from the cavity by manual depression of the part of the adapter projecting from the cavity. The inner-side connector is pulled out through the cavity along with the adapter and may be easily removed for cleaning.

12 Claims, 3 Drawing Sheets

OPTICAL FIBER ADAPTER MOUNTING SYSTEM

FIELD OF THE INVENTION

This invention is concerned with a system for releasably mounting adapters of the type used to hold two fiber optic connectors in optical alignment, on a faceplate, wall, shelf, or another mounting surface.

BACKGROUND OF THE INVENTION

With the proliferation of various optical fiber systems, it is becoming increasingly important to devise systems for efficiently connecting and disconnecting pairs of optical fibers which, when connected, should typically be held in an optical alignment. Two fiber optic cables, or simply optical fibers, can be optically coupled by using connectors and adapters. Known modular connectors are, for example, ST, SC, and FC connectors. Adapters are devices or elements which serve to hold two connectors in coaxial alignment, the holding being firm enough to resist occasional vibration or jostling, yet enabling disconnection when needed.

In some optical fibre distribution systems, it is often necessary to provide cross-connections and interconnections between optical fibers. The prior art is replete with junction boxes, organizers, etc., for that purpose. The boxes, organizers etc. usually have a bulkhead or faceplate (wall, shelf etc.) through which the fiber line or lines extend, the faceplate defining a partition between an inner area or side (normally not accessible to an operator) and an outer side (accessible to an operator). It is on such faceplate that the adapter is mounted, with two connectors coupled thereto, one extending into the inner area and the other in the outer area.

It is known that the faces of the opposite fiber ends and the ferrules encompassing the ends have to be cleaned periodically. For that reason, both the connectors, or at least the optical fiber ends, have to be removed from the adapter. This cannot be achieved easily with the inner-side connector without removing the adapter from the face plate and pulling the inner side connector outside for disassembling from the adapter.

The necessity to remove an adapter from the faceplate has been recognized. Adapters can be attached to the faceplate using tabs, such as described in U.S. Pat. No. 5,317,663 to Beard et al. The tabs enable a threaded connection between the adapter and the faceplate. Alternatively, as described in U.S. Pat. No. 4,749,251 to Moulin, a rotational connection can be employed, but the solution offered in that patent does not apply to axially-mounted adapters and necessitates a special wrench.

Other ways of mounting and removing optical fibre adapters are shown or referred to in U.S. Pat. No. 5,363,467 to Keith and in U.S. Pat. No. 5,274,729 to King et al.

The prior art solutions are complicated and/or bulky and expensive in mass production, or do not appear suitable for the situation where the adapter is to be removed from the faceplate with the inner-side connector.

SUMMARY OF THE INVENTION

In accordance with the invention, there is provided a device and method for mounting a optical fibre adapter on a faceplate dividing an inner area from an outer area, wherein the adapter interconnects a pair of optical fibers coupled with the adapter, typically through connectors, the connectors extending in the inner area and the outer area respectively. The adapter for the purpose of the invention has a body defining an axial through-hole for receiving and coupling the two optical fibers, and at least one outside spring lock. The mounting device according to the invention comprises:

a member adapted to be secured to a faceplate, the member having at least one cavity therethrough sized to receive said adapter, the cavity having walls, an inlet and outlet, a spring means disposed in the cavity to bias said adapter towards one of the side walls when the adapter is inserted into said cavity, and a detent means disposed in the cavity to engage the spring lock when the adapter is inserted into the cavity and biased by the spring means.

The detent is disposed such that when the adapter is forced against the spring means, the engagement of the spring lock and said detent is released thereby enabling the removal of the adapter from the cavity.

The adapter may be designed to receive two optical fiber connectors, at least one of the connectors being sized to pass through said cavity so that when the adapter is removed from the opening, the respective connector (the one disposed on the inner side) can be pulled through the cavity along with the adapter.

Typically, but not necessarily, the connectors are known SC connectors which are designed to be coupled with the adapter by linear, axial motion only. It is however feasible to adapt the mounting device of the invention to adapters suited to other connectors as long as the adapters are of the adequate size and have the external spring clip.

BRIEF DESCRIPTION OF THE DRAWINGS

The features and advantages of the invention will be explained in more detail by way of the following description to be taken in conjunction with the drawings in which.

DETAILED DESCRIPTION OF THE INVENTION

Figure 1:
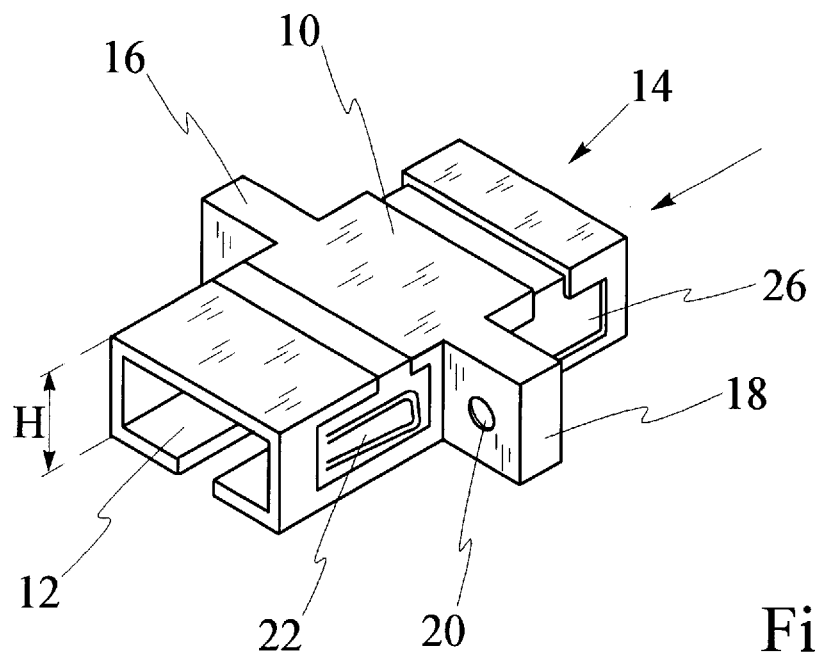
FIG. 1 is an oblique view of a prior art adapter for SC connectors.

While the concept of the present invention is applicable, in principle, to a number of adapters suitable for interconnecting two optical fiber ends, the ends typically provided with ferrules and mounted in standard connectors, it will be recognized that the invention is particularly useful for adapters having a body of a polygonal outside profile, or shape, as seen in axial direction represented by an arrow in FIG. 1. It is less suitable for adapters having circular outside shape, e.g. those designed to be mounted in a bulkhead etc. by threadable turning. The profile does not include the abutment tabs 16, 18.

The polygonal profile/shape is not limited to a rectangular profile. However, known adapters for SC connectors, as schematically illustrated in FIG. 1, have a generally rectangular profile as seen from the direction of the arrow, this also being the direction of the inserting motion of the adapter. Such an adapter is also illustrated in detail e.g. in FIG. 1 of U.S. Pat. No. 5,317,663, the specification of which is incorporated herewith by reference. The present invention will further be illustrated with reference to those SC type adapters only, while not being limited thereto.

As already known from the above US patent, the adapter shown in FIG. 1 has a unitary body 10 made of a plastic material, an axial hole therethrough extending between a first opening 12 and a second, opposite opening 14 (not visible) for receiving a SC connector in each opening respectively. The adapter also has two tabs 16, 18 for supporting the adapter on a planar surface (e.g. by screws, using the holes 20) and for providing an abutment when mounting the adapter on the surface.

Figure 2:
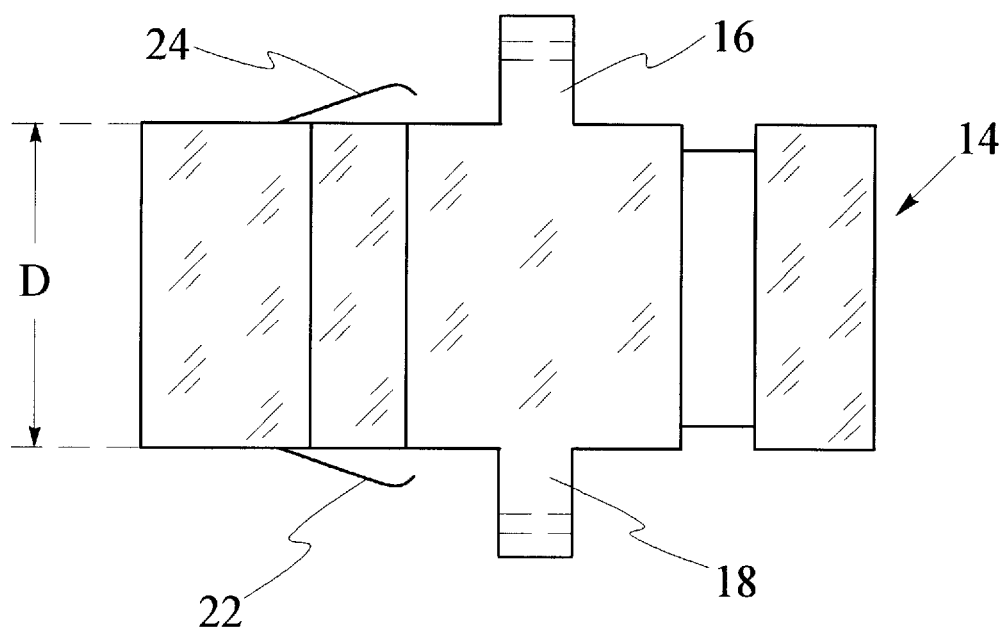
FIG. 2 is a top plan view of the adapter of Fig. 1.

Retaining metallic spring clips 22, 24 are installed on each of two sides of the body 10. The clips are interconnected through a yoke and mounted in shallow cavities 26 of which only one is needed in regular use since only one pair of clips is usually necessary to mount the adapter to a bulkhead etc. When depressed towards the body 10, the clips become flush with the side surface of the body. In the normal position, they extend somewhat away from the body as seen in FIG. 2. In a typical prior art mounting as shown in U.S. Pat. No. 5,274,729, the harpoon-type clips prevent a removal of the adapter without depressing the clips which necessitates access thereto from the opposite (inner) side, which may not be easily accessible as discussed above.

Figure 3:
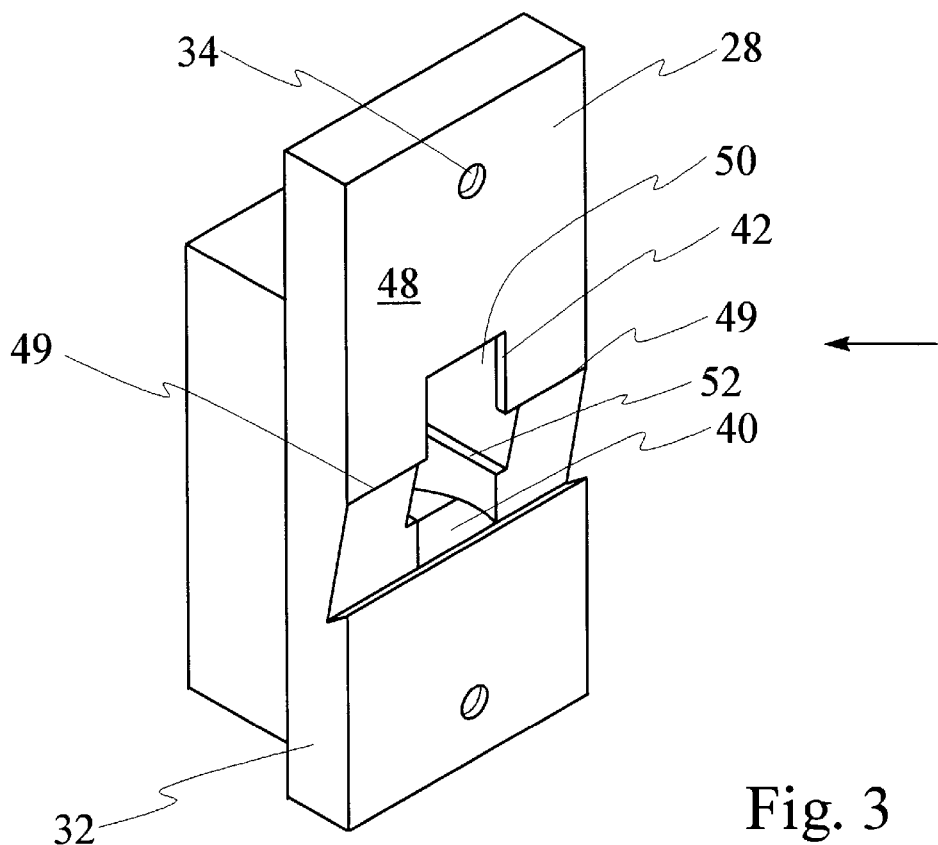
FIG. 3 is an oblique view of a mounting device of the invention, with the spring removed for more clarity.
Figure 4:
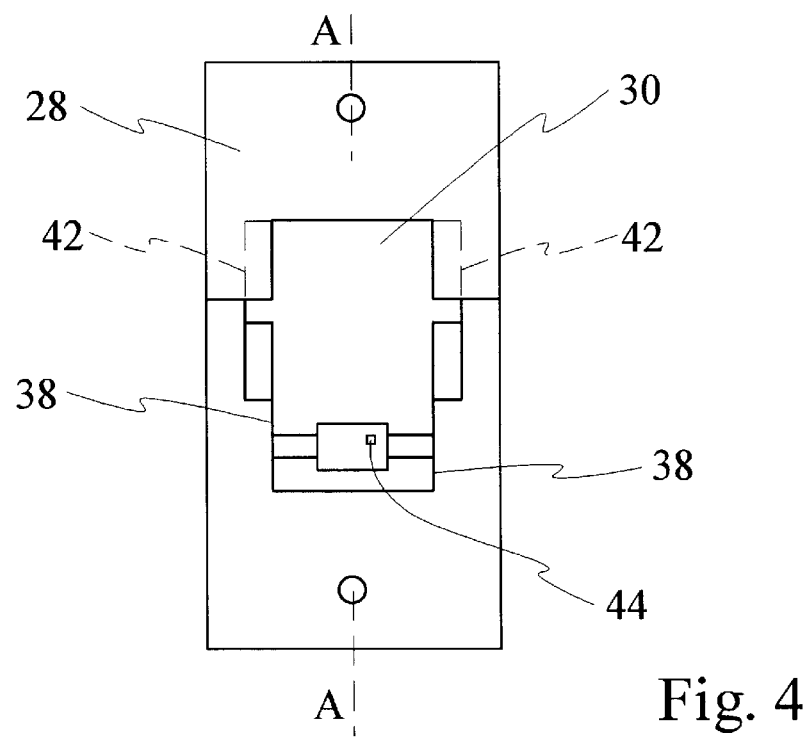
FIG. 4 is a front view of the device of FIG. 3.
Figure 5:
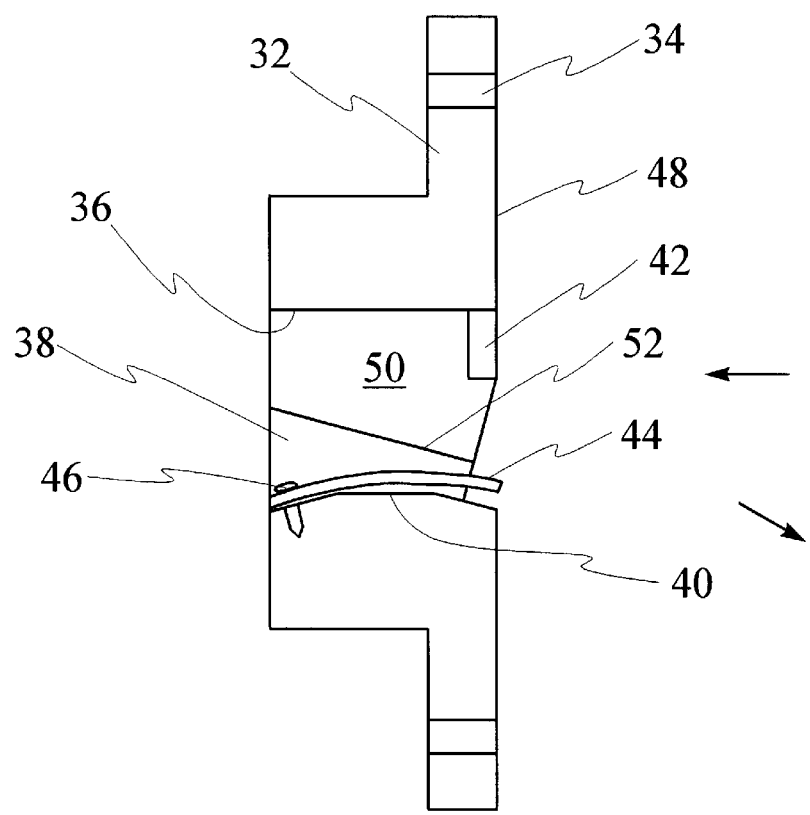
FIG. 5 is a cross-sectional view A—A of the device of FIG. 4.

Turning now to FIGS. 3, 4 and 5, a mounting device of the invention has a body 28 with a single cavity 30 therethrough for inserting the adapter 10 therein. In use, a pair of connectors, not shown, is coupled to the adapter from both sides, through the openings 12, 14. It will be recognized that while the mounting device illustrated and described herein is suitable for a single adapter, such mounting device can easily be "expanded" to accommodate a plurality of adapters by having a corresponding number of the mounting cavities 30.

The body 28 has two flanges 32 with holes 34 for securing the mounting device to a planar surface, e.g. a wall.

Alternatively, the device may form an integral part of, or be permanently affixed to, a dividing bulkhead, wall etc. as discussed hereinabove. In such a case, the flanges may not be necessary, and the body 28 may simply be formed integrally within the dividing wall, e.g. using a polymer moulding technique.

The cavity 30 has a front side indicated by the arrow and defined by the flanges 32, and an opposite back side, as well as an upper wall 36, two side walls 38 and a bottom wall 40. On the front side, in the upper part of the cavity, extend two lips, or bosses 42 serving as detents, sized to engage the clips 22, 24 when the adapter of FIG. 1 is fully inserted into the cavity 30.

The bottom wall 40 of the cavity is shaped, as seen in FIG. 5, such that it is closest to the upper wall 36 in the middle of the cavity 30 (the minimum vertical dimension of the cavity) as seen in axial direction indicated by the arrow in FIG. 3. A leaf spring 44 is attached to the bottom wall 40 with a bolt 46. The bottom wall recedes towards the front of the cavity and towards the back of the cavity for two different reasons. The slant towards the back of the cavity serves solely to accommodate the protrusion of the bolt 46 so that it does not obstruct the insertion of the adapter. The slant towards the front of the cavity serves to create a diverging portion of the cavity extending between its upper wall and the bottom wall 40. The leaf spring 44 has an arcuate shape to adapt to the shape of the bottom wall when depressed towards the bottom wall.

The adapter of FIG. 1 is so dimensioned that its "vertical" size H as seen in FIG. 1 is slightly larger than the distance between the upper wall 36 and the leaf spring 44 in its normal position. The width D of the adapter is slightly smaller than the spacing between the lips 42. The distance between the free ends of the clips 22, 24 and the tabs 16, 18 is slightly larger than the thickness of the lips 42. Thus, when inserted into the cavity 30, the adapter is held in a securely captive position as the leaf spring urges it towards the upper wall 36, the clips 22, 24 engage the lips 42 and the width of the body 10 is in a mating relationship with the side walls 38 subject to an allowance for the spring clips as described below.

To release the adapter, its free end (on the side of the opening 14) is depressed manually downwards, towards the bottom wall 40 of the cavity 30. The spring 44 yields and the adapter tilts to assume an angular position defined by the slant in the front part of the cavity 30 and the elevated portion in the middle of the bottom wall 40. It will be noted however that the geometry of the cavity has to be adapted to the tilting displacement of the adapter whereby the tabs move approximately along an arc. It will be seen in FIGS. 3 and 5 that the front surface 48 of the device slants towards the back of the body 28 below the lips 42 to accommodate the tilting displacement of the adapter. This creates an edge 49 between two adjacent flat portions of the front surface 48 of the device. The design is effective to accommodate the tilt of the adapter, but not ideal; the front surface can be shaped to include an arc approximately between the upper wall 38 and the ridge 52, the radius of the arc corresponding to the length of the portion of the adapter inserted in the cavity 30.

The length of the lips 42 is selected such that when the adapter is fully tilted, the clips of the adapter disengage the lips 42 and the adapter may be removed in the axial direction assumed upon tilting, along the ridges 52. The direction of the inserting and the removal is represented schematically by the arrows in FIG. 5.

The design of the clips 22, 24 necessitates a space for expansion of the clips when the adapter is fully inserted and the ends of the clips 22, 24 clear the lips 42. This means that the side walls 38 of the cavity should accommodate the expanded clips, preferably still providing a close fit for the respective side walls on which the clips are disposed. To this effect, recesses 50 are provided in the side walls 38. The recesses are defined by the top wall 36 and by a ridge 52 extending angularly relative to the top wall, the angle corresponding to the slant of the adapter when fully depressed downwards as described above. The rearmost parts of the side walls below the ridge 52 are thus spaced less than the walls of the recess 50, thus still providing a close limitation of a lateral motion of the adapter when inserted.

Figure 6:
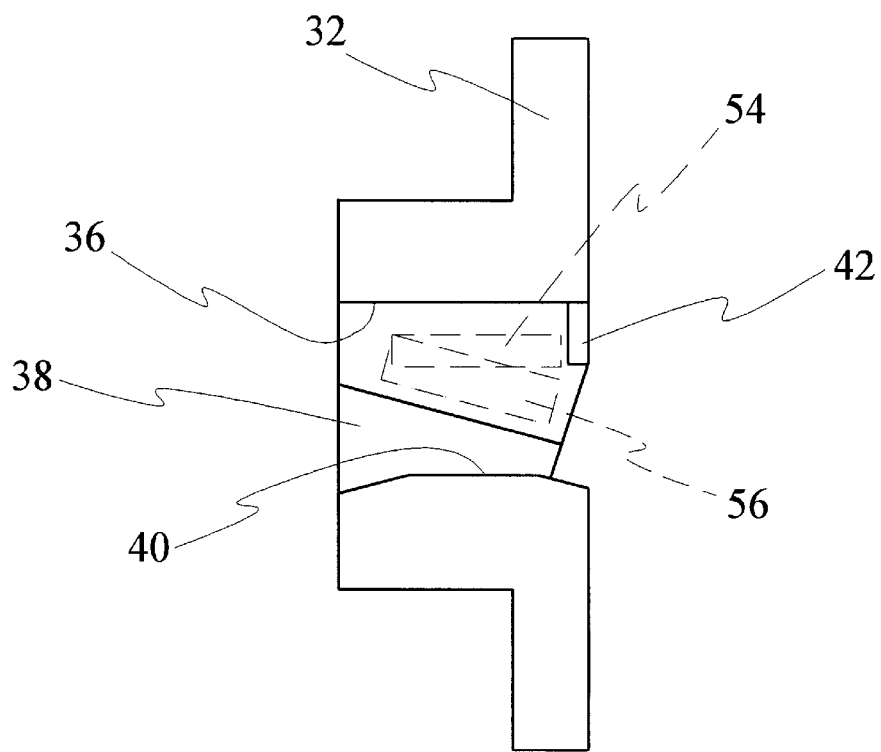
FIG. 6 is a cross-sectional view similar to that of FIG. 5, showing the position of the spring clips when inserted and during removal of the adapter.

FIG. 6 illustrates the position of the spring clips 22, 24 against the cavity 30 when the adaptor is inserted and when it is removed. The leaf spring 44 is not shown for clarity. It will be seen that when the adaptor is fully inserted and biased by the spring 44 (not illustrated) towards the top wall 36, the spring clip 22 shown as a phantom profile 54 engages the lip 42 and is prevented from its axial removal (in a horizontal direction as seen in the figure). When the body of the adapter, not shown, is depressed downwards, the spring clip, shown now as a phantom profile 56, clears the lip 42 and the adaptor can be removed.

The embodiment illustrated and described herein is not limiting. It is conceivable, for example, to design a mounting device, which would accommodate an adapter having a spring clip on the upper wall (as seen in FIG. 1) rather than on two sidewalls. The mounting device, accordingly, would be provided with a lip at the front edge of the top wall of the cavity.

Adapters having entirely round profile could be accommodated according to the invention as long as the rotational displacement during an inadvertent jostling etc. can be avoided, or as long as the design of the adapter incorporates elements preventing such a rotational displacement.

It will be seen that the device of the invention allows an easy removal of the adapter from the cavity by manual depression of the projecting part of the adapter. The device has very few parts and therefore is relatively compact, while allowing a disassembly of the connectors from the adapter without accessing the normally closed area in which one of the connectors may be disposed.

What is claimed is:

1. A device for mounting a fiber optic adapter, the adapter designed for holding two opposite optical fiber ends in optical alignment and having a body comprising a normally projecting spring lock and defining an axial hole through said body for receiving the opposite fiber ends, the mounting comprising a member adapted to be secured to a faceplate, said member having a body, at least one cavity through said body, the cavity sized to receive said adapter and having walls, an inlet and an outlet;

a spring means disposed in said cavity to bias said adapter towards one of the said walls when said adapter is inserted into said cavity, and a detent means disposed in said cavity to engage said spring lock of said adapter when said adapter is inserted into said cavity and biased towards said one of said walls, wherein said detent means is disposed such that when said adapter is forced against the spring means, the engagement of the spring lock and said detent means is released to enable the removal of said adapter from said cavity.

2. The device of claim 1 wherein said adapter is designed to receive two optical fiber connectors, at least one of the connectors being sized to pass through said cavity.

3. The device of claim 1 wherein said spring means is a leaf spring having a fixed end at the outlet of the cavity and a free end disposed adjacent to the inlet of said cavity.

4. The device of claim 3 wherein said detent means is disposed adjacent to the inlet of said cavity.

5. The device of claim 1 wherein said opening has a shape corresponding to the profile of said adapter.

6. The device of claim 2 wherein said cavity connectors are SC connectors.

7. The device of claim 2 wherein said cavity is generally rectangular in front view and has two side walls, a top wall and a bottom wall.

8. The device of claim 7 wherein the bottom wall comprises a portion which is sloped downwardly towards the inlet of the cavity.

9. The device of claim 7 wherein said spring means is disposed at the bottom of the cavity and is displaceable towards or away from the top wall of said cavity.

10. The device of claim 7 wherein said adapter comprises two spring locks on opposite sides of the body thereof, the sides corresponding to the side walls of said cavity.

11. The device of claim 10 wherein said spring means is disposed at the bottom of the cavity and the vertical dimension of said cavity is enlarged relative to the vertical dimension of said adapter compared to a minimum vertical dimension of said cavity so as to accommodate a vertical displacement of said adapter at the inlet of said cavity, the displacement being sufficient for the spring locks to disengage said detent means.

12. The device of claim 10 wherein said side walls comprise regions which are spaced to provide a close fit for the body of said adapter when inserted in said cavity, and recesses which are spaced to accommodate the spring locks when the adapter is disposed within said cavity.

* * * * *